United States Patent [19]

Roy

[11] 3,912,870

[45] Oct. 14, 1975

[54] DIGITAL GROUP MODULATOR

[75] Inventor: Marie-Annick Roy, Antony, France

[73] Assignee: Compagnie Industrielle des Telecommunications Cit-Alcatel, France

[22] Filed: Dec. 7, 1973

[21] Appl. No.: 422,681

[30] Foreign Application Priority Data

Dec. 7, 1972 France .............................. 72.43662

[52] U.S. Cl. ............................ 179/15 FS; 179/15 A

[51] Int. Cl.² .......................... H04J 1/08; H04J 1/18

[58] Field of Search .......... 179/15 FS, 15 FD, 15 A, 179/15 BM

[56] References Cited

UNITED STATES PATENTS

| | | | |
|---|---|---|---|
| 3,573,380 | 4/1971 | Darlington | 179/15 FS |
| 3,676,598 | 7/1972 | Kurth | 179/15 FD |
| 3,761,637 | 9/1973 | Henrion | 179/15 A |

OTHER PUBLICATIONS

IEEE Transactions on Communication Technology; Vol. Com. 19, No. 1; February, 1971; "SSB/FDM Utilizing TDM Digital Filters" by Kurth; pp. 63–71.

7th International Conference on Communications; June, 1971; pp. 22–31 to 22–36; "An Exploratory Terminal ..." by Freeny et al.

*Primary Examiner*—David L. Stewart
*Attorney, Agent, or Firm*—Craig & Antonelli

[57] ABSTRACT

Group modulator having digital operation for processing samples taken from n voice frequency channels. Digitized samples are divided into a plurality of subgroups, for example two subgroups of n/2 channels, and applied through first and second double modulation circuits. The respective outputs of the modulation circuits are applied through a circuit which is alternately switched to add and subtract the outputs. After the sums and remainders have been passed through a digital to analog converter, they are alternately switched to be applied through separate analog filters having different pass bands to a common output.

3 Claims, 2 Drawing Figures

DIGITAL GROUP MODULATOR

The invention comes within the branch of modulators used for constituting frequency multiplex current carrier systems based on voice frequency channels, by joining together channels in a group of n channels, for example, a twelve channel primary group. It concerns a modulator of that type operating by digital processing of the coded pulses extracted from the quantified levels sampled periodically from the local vocal currents.

British Pat. Application No. 31753/73 filed on July 3, 1973, describes a digital processing device for constituting a group of telephonic channels in a frequency multiplex system, for example, a basic primary group covering a range of 60–108 kc/s. That device taking advantage of the particularities afforded by digital processing, forms in a single chain of elements a premodulation system then a group modulation system having twelve channels at voice frequency with two carrier frequencies, the premodulation stage and the modulation stage each operating on carriers (sampled) in sinus and cosinus form.

The device comprises an adder which calculates the sum of two series of digital values and ends in a digital to analog converter and an analog band pass filter.

The simplification and economy in components is achieved at a cost of a relatively high clock frequency, reaching, for twelve channels, 2688 kc/s. That frequency is obtained as a product of a basic sampling of 112 kc/s, multiplied by the number of channels, that is, twelve, again multiplied by two, for the double sampling of the carriers in sinus and cosinus form.

On examining again a device for modulation by two-path digital processing, with modulation by carriers in sinus form on one path and carriers in cosinus form on the other path and adding of the products of modulation at the output with a higher number of components than in the preceding case, a maximum clock frequency which is half that in the case of a single path which is the object of the above-referenced patent application, that is, 1344 kc/s, is obtained.

The present invention gives a means for reducing the sampling frequency (112 kc/s in the above case) by subdividing the band covered by the group in consideration, for example, 60–108 kc/s in the case of a basic primary group having a width of $\Delta F = 48$ kc/s, having an upper limit $F = 108$ kc/s, into several subgroups, for example, two subgroups, 60–84 kc/s and 84–108 kc/s, or even, four subgroups 60–72 kc/s, 72–84 kc/s, 84–96 kc/s, 96–108 kc/s. The sampling frequency is 56 kc/s for a subdivision into two subgroups and 28 kc/s for a subdivision into four subgroups. The reduction in the sampling frequency and processing frequency is an advantage, as the logic circuits operating at very high speed are relatively expensive and less reliable than the slower circuits.

At the output of the digital processing assembly, each subgroup is extracted in the analog form by a band pass filter having a corresponding band width, either two pass bands in the first case or four pass bands in the second case and the required primary group is found again by joining together the output currents of the two or four subgroup filters.

The invention will be described in detail in the case of a modulator having two paths, which accepts lower sampling frequencies, but it must be understood that the invention covers also the case of the modulator having one path. A subdivision into two subgroups has been adopted, with a sampling frequency $F_s = 56$ kc/s.

FIG. 1 illustrates the case of the multiplexing of $n = 12$ voice frequency channels, having a unit width of 4 kc/s, into a basic primary group of 60–108 kc/s, by digital processing, with subdivision into two subgroups.

Figure 1:
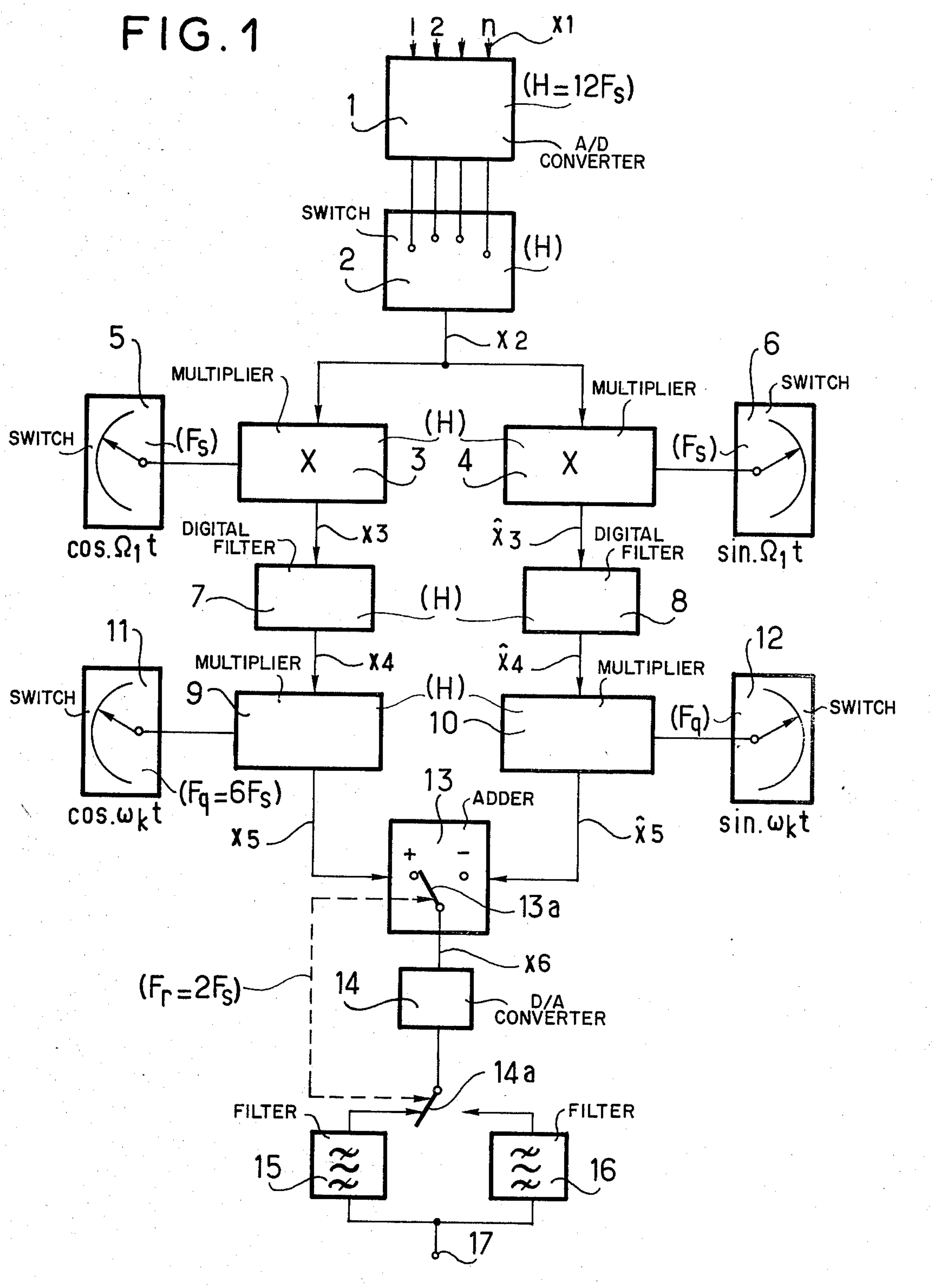
FIG. 1 is a general diagram of an equipment for the forming of a group of n channels by digital processing, with subdivision into two subgroups having n/2 channels, for example, a basic primary group having twelve channels subdivided into two subgroups of six channels each.

The processing with subdivision into four subgroups, or possibly more than four subgroups, would be deduced therefrom immediately.

The processing is effected on samples which are drawn from each channel at a sampling frequency $F_s = 56$ kc/s.

N (n) voice frequency signals 1, 2 . . . n (signal $x1$), where $n = 12$ in the present case, reach a time sharing analog to digital converter 1. The converter 1 operates at the rhythm $H = 12 \times 56 = 672$ kc/s.

Each voice frequency channel covers a low-frequency spectrum of 300 to 3400 kc/s, having a band width of $B = 3100$ c/s. The middle frequency $F1 = 300 + 3400/2 = 1850$ c/s is the premodulation carrier frequency. (see below)

On each of the $n$ outputs of the converter 1, each sampled level is coded by $p$ bits in parallel (for example, $p = 12$).

A switch 2 operating at the same rhythm $H = 672$ kHz reads, in succession, the p bit coding in parallel of each of the 12 channels during a "frame" period of 1/56 = 17.8 μs.

The common of the switch 2 applies a signal $x2$ to an input of a first path comprising the elements 3, 7, 9.

Three (3) is a first multiplier which receives on an input the said signal $x2$ and on another input the common of a switch 5, which receives a certain number of sampled values of cos $\Omega_1 t$, with $\Omega_1 = 2\pi F_1$. The multiplier 3 operates at the clock pulse rhythm H.

The switch 5 operates at the rhythm $F_s = 56$ kc/s.

The number of samples of cos $\Omega_1 t$ (period $1/F_1 = 540$ μs) is equal to the number of frames (individual duration 17.8 μs) during that period, that is, about 30 values.

Each of these values is kept identical during a frame period of 17.8 μs. These values are coded, for example, in $p$ bit code ($p = 12$). The multiplier 3 deriving its rhythm from H, supplies in principle $2p$ bits, in which, preferably, only the heavy weight $p$ bits are kept.

The output signals x3 of the multiplier 3 are applied to a digital filter 7, known per se, having periodic response, with a band width of B, having a band centered on $\pm nF_s$ ($n = 0, 1, 2, \ldots$). The filtered signals x4 are applied to a second multiplier 9, which receives from a switch 11 currents $\Omega\ kt$ in the cosinus form, where $\omega = 2\pi f_k$. Here $f_k$ assumes, by circular permutation, n/2 values, this being six values in 4 kc/s increments. The multiplier 9 operates at the rhythm H; the switch 11 operates at the rhythm $F_q = 6 \times 56$ kc/s.

The output signals of the multiplier 9 are designated by x5. The signal $x2$ is applied at the same time to a second path constituted exactly like the said first path (multiplier 4, digital filter 8, multiplier 10) and operating in the same way, but here, the switch 6 receives a current in the form sin $\Omega_1 t$ and the switch 12 receives currents in the form sin $\Omega_k t$. The corresponding signals are dsignated by $\hat{x}3$, $\hat{x}4$, $\hat{x}5$.

Reference numeral 13 is a digital adder which receives on one side the signals $x5$ coming from the multiplier 9 and from another side the signals in quadrature $\hat{x}5$ coming from the multiplier 10.

It is known that in a transposer-modulator having two paths, of the type of that which is used herein according to FIG. 1, an element joining together the output signals of the two paths provides channels transposed into direct modulation or two reverse modulation, according to whether the joining element operates as a summing machine for signals in phase or as a subtracting machine for signals in phase opposition. At the same time, there is a canceling of the unrequired signals (either adding of the signals in phase opposition or subtracting of the signals in phase).

This is the case of the digital adder 13 which, under the control of an inverter 13*a* operating at a rhythm of $F_r = 2 \times F_s$, operates, by well-known simple means, either as a summing machine or as a subtracting machine.

At the output of the digital adder 13, the signals $x6$ are applied to a digital to analog converter 14, whose output is switched by an inverter 14*a* synchronized in relation to the inverter 13*a*, either on the input of a band pass filter 15 having a pass band of 60–84 kc/s, or on a band pass filter 16 having a pass band of 84–108 kc/s.

The two filters 15 and 16 have their outputs joined together at a point 17 where a basic primary group of twelve channels covering the band 60–108 kc/s is obtained.

Figure 2:
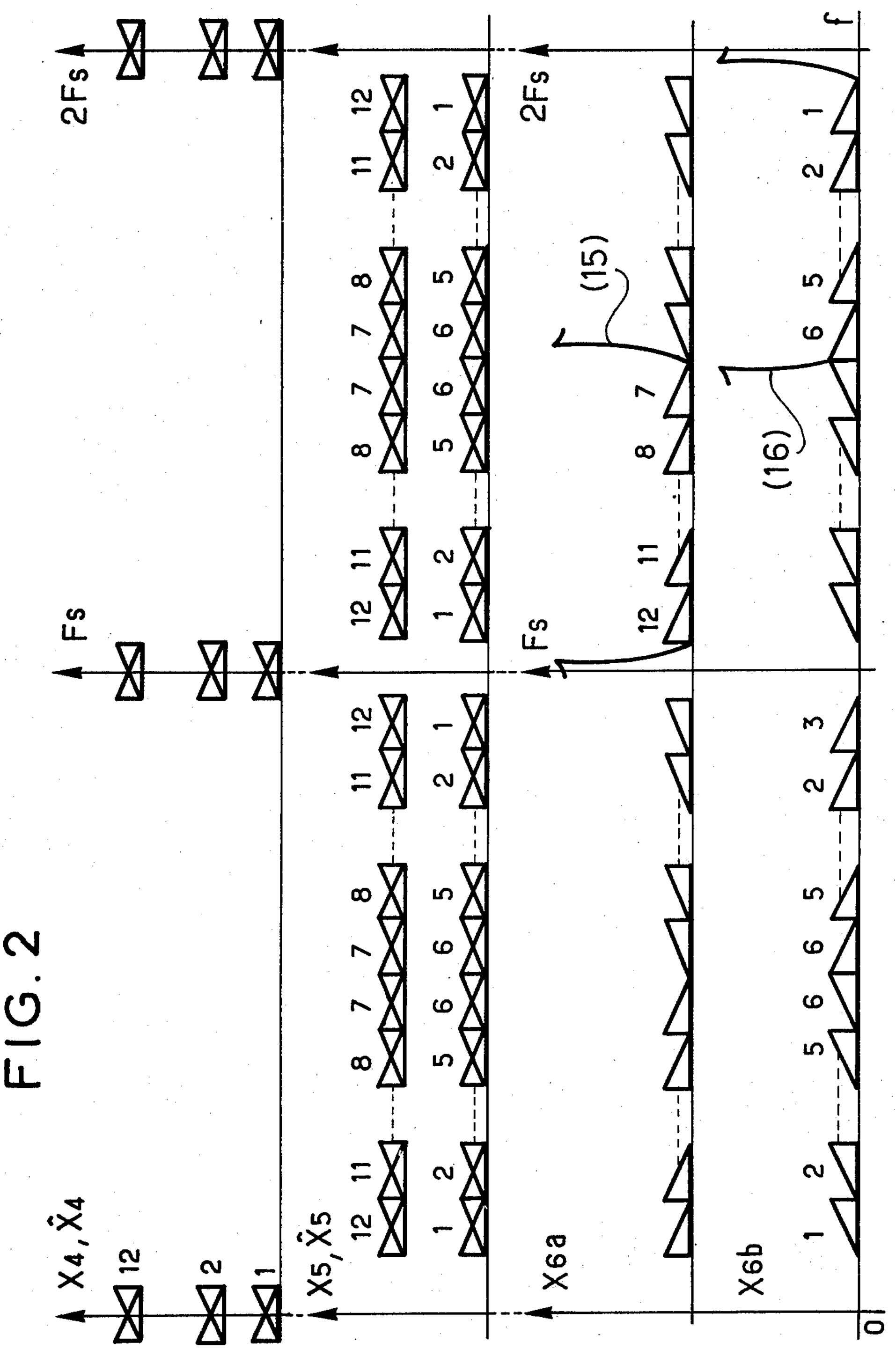
FIG. 2 is a diagram showing the position and the form of the spectra obtained at the various phases of the operation.

FIG. 2 shows symbolically between 0 and $2f_s$, that is, between 0 and 112 kc/s, the distribution of the spectra of the channels contained in the signals $x4$, $\hat{x}4$, $x5$, $\hat{x}5$, and $x6$, that is X4, $\hat{X}4$, X5, $\hat{X}5$, and X6*a* and X6*b*.

The voice frequency channels sampled at the frequency $F_s$, then brought by the frequency $F_1$ taken from the middle of the voice band, then filtered by the filters 7 and 8, provide twelve folded spectra, around 0, $F_s$, $2F_s$, etc., that is, twice 6 spectra for the channels 1 to 6 and twice six spectra for the channels 7 to 12 between 0 and $F_s$ (= 56 kc/s). Between F and 2F (= 112 kc/s), a first series of six spectra of the channels 1 to 6, obtained by sums $F_s + f_k$ and a second series of six spectra of the channels 1 to 6, obtained by differences $2F_s - f_k$, are likewise found.

A first series of six spectra of the channels 7 to 12 obtained by sums ($F_s + f_k$, and a second series of six spectra of the channels 7 to 12 obtained by differences ($2.F_s - f_k$, are also found between $F_s$ and $2F_s$.

Due to the fact of the double switching 13*a*, 14*a*, the channels X6*a* are received during one half frame (rhythm $F_r = 2F_s$) and the channels X6*b* are received during the other half frame. In the first case, the filter 15 having the gauge marked (15) in FIG. 2, extracted from the reverse modulation channels 7 to 12, and in the second case, the filter having the gauge marked (16) in FIG. 2 extracted from the reverse modulated channels 1 to 6, this supplying to the terminal 17 (FIG. 1) the twelve reverse modulated channels in the 60–108 kc/s band, according to international standards.

Within the scope of the invention, a subdivision of a band in a ratio greater than two, for example, four, could be used.

The invention is not limited to a group of twelve channels; it applies to any number of channels, for example, to a secondary group.

The application of the invention to a modulator having one path of the type in the related patent is immediate. In that case, benefit is derived from the economy of components in relation to the modulator having two paths, while reducing the processing speed by half.

What is claimed is:

1. A group modulator having digital operation for processing samples drawn from n voice frequency channels comprising sampling means for sampling said n voice frequency channels at a frequency $F_s$, analog-digital converter means for converting the samples to digital values, first and second double modulation circuits connected to each receive the outputs of said analog-digital converter means and providing respective outputs including a plurality of sampled carrier frequencies equal in number to n/2, said first and second double modulation circuits each including a first modulation stage connected to receive the digital samples and a sampled modulation signal, the sampled modulation signals representing sine and cosine values of a first modulation frequency in the respective first modulation stages, said first and second double modulation circuits each further including a digital filter connected to the output of said first modulation stage and a second modulation stage connected to the output of the digital filter and to means providing a sampled modulation signal, the sampled modulation signals applied to said second modulation stage representing sine and cosine values of a second modulation frequency in the respective second modulation stages, a digital adder connected to the respective outputs of said first and second double modulation circuits including reversing switch means for alternately reversing the operation of said digital adder between addition and subtraction of said respective modulator outputs, a digital-analog converter connected to the output of said digital adder, first and second analog filters having their outputs connected in common, and additional switch means connected to operate at the same frequency as and in phase synchronization with said reversing switch means for alternately connecting the output of said digital-analog converter to the respective inputs of said first and second analog filters.

2. A group modulator as defined in claim 1 wherein the modulation signal applied to said second modulation stage is sampled at a frequency which is an integral multiple of the sampling frequency of the modulation signal applied to said first modulation stage in each modulation circuit.

3. A group modulator as defined in claim 2 wherein said reversing switch means is operated at a frequency of $2F_s$.

* * * * *